United States Patent [19]

Brown

[11] 3,859,587

[45] Jan. 7, 1975

[54] THYRISTOR PROTECTION CIRCUIT FOR INVERTERS
[75] Inventor: Harold J. Brown, Lorain, Ohio
[73] Assignee: Lorain Products Corporation, Lorain, Ohio
[22] Filed: Jan. 7, 1974
[21] Appl. No.: 431,359

[52] U.S. Cl. .............................................. 321/45 C
[51] Int. Cl. ............................................ H02m 7/52
[58] Field of Search ................................. 321/45 C

[56] References Cited
UNITED STATES PATENTS
3,349,315  10/1967  Studtmann ........................ 321/45 C
3,559,034   1/1971  Jensen et al. ................. 321/45 C X
3,601,683   8/1971  Brown ............................ 321/45 C X
3,683,267   8/1972  Akamatsu ....................... 321/45 C X
3,701,939  10/1972  Petersen et al. .............. 321/45 C X Primary Examiner—R. N. Envall, Jr.
Attorney, Agent, or Firm—Edward C. Jason

[57]  ABSTRACT

A circuit for preventing reverse voltage breakdown in the thyristors of center-tapped source inverters. A plurality of clamp diodes are utilized to limit the reverse voltage across inverter thyristors in the presence of the voltage spikes produced by the inductances of the inverter during commutation. The reverse voltage is limited to a value low enough to protect the thyristors from reverse voltage breakdown and yet high enough to assure a relatively short reverse recovery time.

12 Claims, 1 Drawing Figure 3,859,587

THYRISTOR PROTECTION CIRCUIT FOR INVERTERS

BACKGROUND OF THE INVENTION

This invention relates to inverters and is more particularly directed to circuitry for preventing reverse voltage breakdown in the thyristors of center-tapped-source type inverters.

Prior to the present invention, the inductances in the commutating circuitry of center-tapped source inverters have produced inductive voltage spikes which tended to cause reverse voltage breakdown in the inverter thyristors. One method of reducing the probability of such reverse voltage breakdown has been to use snubber circuits. Snubber circuits usualliy consisted of series resistor-capacitor networks connected between the anode and cathode of each inverter thyristor to limit the time rate of change of the voltage across that thyristor. These snubber networks did, to some extent, reduce the amplitude of the inductive voltage spikes, but did not completely eliminate reverse voltage breakdown. In addition, snubber circuits have the disadvantage of lengthening the reverse recovery time of the thyristors.

Another method of reducing the probability of reverse voltage breakdown in inverter thyristors has been to use a low voltage clamp which consisted of a diode connected in inverse parallel with each inverter thyristor. In such clamping arrangements the anode of each thyristor was connected to the cathode of the respective diode and the cathode of each thyristor was connected to the anode of the respective diode to limit the reverse voltage across each thyristor to the forward conduction voltage of the diode. While these diodes did provide protection against inductive voltage spikes, they have the disadvantage of substantially increasing the reverse recovery time of the thyristors.

The present invention provides a high voltage limiting circuit which causes the reverse voltage across each thyristor to have a value sufficiently high to provide fast reverse recovery and yet sufficiently low to prevent reverse voltage breakdown.

SUMMARY OF THE INVENTION

It is an object of the invention to provide an improved inverter circuit.

Another object of the invention is to provide clamping circuitry for protecting inverter thyristors from reverse voltage breakdown caused by excessive reverse voltage.

A further object of the invention is to limit the reverse voltage across each thyristor of an inverter to a predetermined safe value.

It is still another object of the invention to provide clamping circuitry of the above character which lessens the reverse recovery time of the thyristors.

Yet another object of the invention is to provide clamping circuitry which limits the amplitudes of the voltage spikes across each winding of the commutating inductor of a center-tapped-source inverter and thereby limits the reverse voltage across each inverter thyristor.

Still another object of the invention is to provide an inverter circuit of the above character wherein the commutating capacitors are coupled to the inverter circuitry through connectors having a relatively low distributed inductance.

DESCRIPTION OF THE INVENITON

Figure 1:
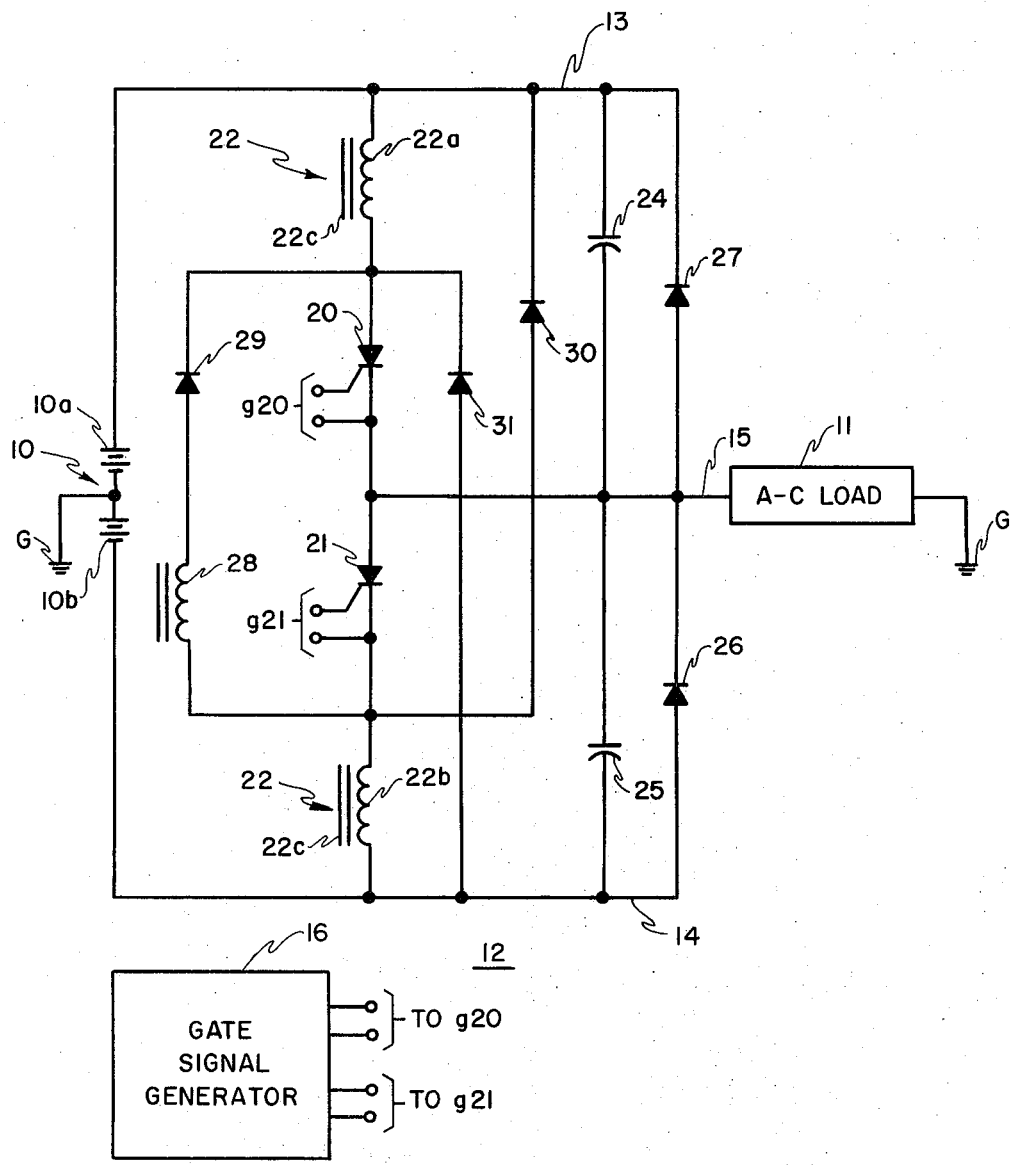
FIG. 1 is a schematic diagram of one exemplary circuit embodying the invention.

Referring to FIG. 1, there is shown a center-tapped d-c voltage source 10 for energizing an a-c load 11 through an inverter 12 of the center-tapped-source or series half-bridge type. Inverter 12 serves to alternately connect the positive and negative sections 10a and 10b, respectively, of d-c source 10 to a-c load 11 to establish an a-c voltage thereacross. During the positive half-cycle of the a-c voltage, the path for current flow through load 11 includes positive d-c source 10a, a positive bus 13, a winding 22a of a commutating inductor 22, a thyristor 20, an a-c bus 15 and a circuit common or ground G. Similarly, during the negative half-cycle of the a-c voltage, the path for current flow through load 11 includes ground G, a-c bus 15, thyristor 21, a winding 22b of commutating inductor 22, a negative bus 14 to negative d-c source 10b.

Because the voltage drops across windings 22a and 22b and the forward conduction voltages of thyristors 20 and 21 are generally small in relation to the voltage of source 10, load 11 is effectively connected across positive d-c source 10a during each positve half-cycle of the a-c output voltage. Similarly, load 11 is effectively connected across negative d-c source 10b during each negative half-cycle of the a-c output voltage. Thus, inverter 12 establishes across load 11 an a-c voltage having a peak amplitude equal to one-half of the voltage of d-c source 10.

In the present embodiment, inverter 12 includes a commutating inductor 22 having first and second windings 22a and 22b which may be located on a common core 22c. Inverter 12 also includes commutating capacitors 24 and 25, first and second switching thyristors 20 and 21, respectively, and first and second reactive power or energy return diodes 26 and 27, respectively. In order to establish the above described positive and negative half-cycles of voltage across a-c load 11, thyristors 20 and 21 are alternately gated into conduction by gating signals produced by a suitable gate signal generator 16 having its outputs connected to the gates g20 and g21 of thyristors 20 and 21, respectively.

The operation of inverter 12 will now be described. Assuming that thyristor 20 is conducting, a-c bus 15 will be at a potential approximately equal to that of positive bus 13. Under these conditions, capacitor 25 will be charged to a voltage approximately equal to the voltage of d-c source 10. Thereafter, when thyristor 21 is gated into conduction, commutating capacitor 25 will discharge in a loop including thyristors 21 and winding 22b to induce across windings 22a and 22b a voltage approximately equal to the voltage across source 10. As a result, a current which is in opposition to the forward conduction current of thyristor 20 will begin to flow through winding 22a and thyristor 20. When this current flow becomes larger than the forward conduction current of thyristor 20, the latter will begin to turn off.

As thyristor 20 turns off, the conduction of thyristor 21 causes the potential of a-c bus 15 to approach the potential of negative bus 14 and thereby establish the negative half-cycle of the a-c voltage. At the same time, capacitor 24 becomes charged to a voltage approximately equal to the voltage of source 10. It will be understood that after the negative half-cycle of the a-c voltage has been established, inverter 12 will be in condition to establish the positive half-cycle of a-c voltage upon the gating of thyristor 20, the establishment of the positive half-cycle occurring in a fashion similar to that described in connection with the establishment of the negative half-cycle.

Ordinarily, the energy which remains in capacitor 25 ater the turn-off of thyristor 20 is dissipated in the form of heat. In order to eliminate this dissipation and thereby increase the efficiency of inverter 12, there is provided a resonant discharge circuit comprising an inductor 28 and a diode 29. This resonant discharge circuit serves to transfer the energy which is trapped in the discharging commutating capacitor after commutation to the charging commutating capacitor by means of a resonant discharge current established through inductor 28. Circuitry of this type is described, in detail, in the patent of Harold J. Brown, U.S. Pat. No. 3,601,682, issued Aug. 24, 1971, entitled, "Energy Recovery Circuit for Inverters."

As is well known to those skilled in the art, when current flow through an inductor is interrupted as, for example, by the turn off of a thyristor, an inductive voltage spike will be induced across that inductor. Similarly, when the current flow through a distributed inductance is interrupted, as by the turn off of a thyristor, an inductive voltage spike will be induced across that distributed inductance. If the inductor or the distributed inductance or both are in a closed circuit path with a thyristor, the combined voltage spike may appear across that thyristor as an excessive reverse voltage, causing reverse voltage breakdown. In the past, thyristor protection circuitry has been designed to protect the thyristors from reverse voltage breakdown to the detriment of reverse recovery time of the thyristors.

In the present embodiment, the voltage limiting circuitry of the invention includes first and second voltage clamping means 31 and 30, respectively, which here takes the form of diodes. First voltage clamping diode 31 connects the negative bus 14 and a junction 32 of winding 22a and thyristor 20. Similarly, second voltage clamping diode 30 connects the positive bus 13 and a junction 33 of winding 22b and thyristor 21. As will now be described, these connections of diodes 30 and 31 cause the reverse voltage which appears across either inverter thyristor to be limited to a value which is high enough to assure rapid reverse recovery and yet low enough to prevent reverse breakdown.

Assuming that the turn on of thyristor 21 has begun the commutation of thyristor 20, the induced voltage on winding 22a causes commutating current to flow in the loop including winding 22a, positive bus 13, capacitor 24 and thyristor 20. After thyristor 20 turns off and interrupts this current flow, winding 22a produces a reverse voltage spike across thyristor 20 in an attempt to maintain the then existing current flow. When the latter voltage tries to rise above the voltage across capacitor 25, diode 31 becomes forward biased and clamps the reverse voltage of the thyristor to the voltage across capacitor 25, that is, a voltage which, as previously described, is at that time equal to the voltage of source 10. At the same time, the commutating current which had flowed through thyristor 20 is redirected into the path including winding 22a, positive bus 13, capacitor 24, capacitor 25 and diode 31. Thus, diode 31 allows the reverse voltage across thyristor 20 to rise to but not beyond the voltage of source 10 and at the same time provides an alternate path for the flow of inductive current.

Similarly, assuming that the turn on of thyristor 20 has begun the commutation of thyristor 21, the induced voltage across winding 22b causes commutating current to flow in the loop including winding 22b, thyristor 21, capacitor 25 and negative bus 14. After thyristor 21 turns off and interrupts this current flow, winding 22b produces a reverse voltage spike across thyristor 21 in an attempt to maintain the current flow. When the latter voltage attempts to rise above the voltage across capacitor 24, diodes 30 becomes forward biased and clamps the reverse voltage across thyristor 21 to the voltage across capacitor 24, that is, a voltage which, as previously described, is at that time equal to the voltage of source 10. At the same time, the current which had been flowing through thyristor 21 is redirected into the path including winding 22b, diode 30, capacitor 24, capacitor 25 and the negative bus. Thus, diode 30 allows the reverse voltage across thyristor 21 to rise to but not beyond the voltage of source 10 and at the same time provides an alternate path for the flow of inductive current.

One of the important advantages of the clamping circuitry of the invention is that it allows the reverse voltage across each thyristor to rise to but not beyond the voltage of source 10. This is an advantage because the reverse recovery time of a thyristor is a function of the applied reverse voltage. Accordingly, it will be seen that the relatively high value of the clamped reverse voltage results in a shorter reverse recovery time than, for example, the reverse recovery time of inverter circuits wherein inverse parallel connected diodes limit the reverse voltage across each thyristor to the forward conduction voltage of the associated diode. At the same time, the clamping circuitry of the invention assures that the reverse voltage of the thyristor does not exceed a safe valve, the supply voltage being a safe value since inverters are ordinarily designed with thyristors which can safely withstand the d-c supply voltage. Thus, the circuit of the invention assures that the reverse voltage across each off-going thyristor has a value high enough to afford a relatively short reverse recovery time and low enough to prevent reverse voltage breakdown.

As previously described, the turn off of a thyristor induces a voltage spike across the distributed inductance of the inverter. Since a distributed inductance is present in the loop including thyristristor 20, capacitor 25 and diode 31, there may appear in that loop a voltage spike which will allow the voltage across the thyristor 20 to exceed the above described clamped value. Similarly, since a distributed inductance is present in the loop including thyristor 21, diode 31 and capacitor 24, there may appear in that loop a voltage spike which will allow the voltage across thyristor 21 to exceed the desired clamped value. If this problem is found to exist, it may, however, be solved by connecting the commutating capacitors to the thyristors through low inductance connectors such as twisted pairs. It will, therefore, be seen that the circuitry of the invention can be almost so easily applied to existing inverters as it can to inverters which are designed with the presence of the clamping diodes in mind.

In view of the foregoing, it will be seen that a circuit constructed in accordance with the invention is adapted to force the reverse voltage of inverter thyristors to have a value which is high enough to assure a relatively short reverse recovery time and yet low enough to protect the thyristors from reverse voltage breakdown.

It will be understood that the embodiment shown herein is for illustrative purposes only and may be modified without departing from the spirit and scope of the appended claims.

What is claimed is:

1. In an inverter, in combination:
   a positive bus;
   a negative bus;
   an a-c bus;
   first switching means for controlling the flow of current between the positive bus and the a-c bus;
   second switching means for controlling the flow of current between the a-c bus and the negative bus;
   means for alternately energizing the first and second switching means;
   a commutating inductor having first and second coupled windings;
   means for connecting the first switching means to the positive bus through the first winding of the commutating inductor and to the a-c bus;
   means for connecting the second switching means to the negative bus through the second winding of the commutating inductor and to the a-c bus.
   first and second capacitors;
   means for connecting the first capacitor between the positive bus and the a-c bus;
   means for connecting the second capacitor between the negative bus and the a-c bus;
   means for limiting the reverse voltages across the first and second switching means to voltages approximately equal to the voltages across the first and second capacitors; and
   means for connecting the limiting means to the negative bus, to the first switching means, to the positive bus and to the second switching means.

2. An inverter as set forth in claim 1 including resonant discharging means for transferring energy between the first and second capacitors and means for connecting the resonant discharging means to the first and second switching means.

3. An inverter as set forth in claim 1 wherein the limiting means includes a first clamping diode connected between the negative bus and the first switching means to limit the voltage across the first switching means and a second clamping diode connected between the positive bus and the second switching means to limit the voltage across the second switching means.

4. An inverter as set forth in claim 1 wherein the first and second capacitors are located remotely from the first and second switching means and are connected to the first and second switching means through connectors having a relatively low distributed inductance.

5. In an inverter in combination:
   a positive bus;
   a negative bus;
   an a-c bus;
   first switching means for controlling the flow of current between the positive bus and the a-c bus;
   second switching means for controlling the flow of current between the a-c bus and the negative bus;
   means for alternately energizing the first and second switching means;
   a commutating inductor having first and second coupled windings;
   means for connecting the first switching means to the positive bus through the first winding of commutating inductor and to the a-c bus;
   means for connecting the second switching means to the negative bus through the second winding of the commutating inductor and to the a-c bus;
   first and second capacitors;
   means for connecting the first capacitor between the positive bus and the a-c bus;
   means for connecting the second capacitor between the negative bus and the a-c bus;
   first and second voltage clamping means for limiting the reverse voltages across the respective first and second switching means to the voltage between the positive and negative busses;
   means for connecting the first voltage clamping means to the negative bus and to the first switching means; and
   means for connecting the second voltage clamping means to the positive bus and to the second switching means.

6. An inverter as set forth in claim 5 wherein the first and second capacitors are located remotely from the first and second switching means and are connected to the first and second switching means through connectors having a relatively low distributed inductance.

7. An inverter as set forth in claim 5 wherein the means for connecting the first clamping means to the negative bus and to the first switching means comprises means for connecting the first clamping means to the negative bus and to the junction of the first winding and the first switching means and wherein the means for connecting the second clamping means to the positive bus and to the second switching means comprises means for connecting the second clamping means to the positive bus and to the junction of the second winding and the second switching means.

8. An inverter as set forth in claim 7 including a resonant discharge circuit for transferring energy between the first and second capacitors, said discharge circuit comprising an inductor in series with a diode, said discharge circuit being connected between the junction of the first winding and the first switching means and the junction of the second winding and the second switching means.

9. In an inverter, in combination:
   a positive bus;
   a negative bus;
   an a-c bus;
   a first thyristor for controlling the flow of current between the positive bus and the a-c bus;
   a second thyristor for controlling the flow of current between the a-c bus and the negative bus;
   means for alternately energizing the first and second thyristors;
   a commutating inductor having first and second coupled windings;
   means for connecting the first thyristor to the positive bus through the first winding of the commutating inductor;
   means for connecting the second thyristor to the negative bus through the second winding of the commutating inductor;

means for connecting the first and second thyristors to the a-c bus;
first and second commutating capacitors;
means for connecting the first capacitor between the positive bus and the a-c bus;
means for connecting the second capacitor between the negative bus and the a-c bus;
a first clamping diode for limiting the reverse voltage across the first thyristor to the voltage across the second capacitor;
a second clamping diode for limiting the reverse voltage across the second thyristor to the voltage across the first capacitor;
means for connecting the first clamping diode between the negative bus and the junction of the first thyristor and the first winding; and
means for connecting the second clamping diode between the positive bus and the junction of the second thyristor and the second winding.

10. An inverter as set forth in claim 9 including a first reactive power diode connected across the first capacitor and a second reactive power diode connected across the second capacitor.

11. In an inverter, in combination:
a positive bus;
a negative bus;
an a-c bus;
first switching means for controlling the flow of current between the positive bus and the a-c bus;
second switching means for controlling the flow of current between the a-c bus and the negative bus;
means for alternately energizing the first and second switching means;
a commutating inductor having first and second coupled windings;
means for connecting the first switching means to the positive bus through the first winding of the commutating inductor;
means for connecting the first switching means to the a-c bus;
means for connecting the second switching means between the negative bus and the a-c bus through the second winding of the commutating inductor;
first and second capacitors;
means for connecting the first capacitor between the positive bus and the a-c bus;
means for connecting the second capacitor between the negative bus and the a-c bus;
a clamping diode for limiting the reverse voltage across the first switching means to the voltage across the second capacitor; and
means for connecting the clamping diode to the negative bus and to the junction of the first switching means and the first winding.

12. In an inverter, in combination:
a positive bus;
a negative bus;
an a-c bus;
first switching means for controlling the flow of current between the positive bus and the a-c bus;
second switching means for controlling the flow of current between the a-c bus and the negative bus;
means for alternately energizing the first and second swtiching means;
a commutating inductor having first and second coupled windings;
means for connecting the first switching means between the positive bus and the a-c bus through the first winding of the commutating inductor;
means for connecting the second switching means to the negative bus through the second winding of the commutating inductor;
means for connecting the second switching means to the a-c bus;
first and second capacitors;
means for connecting the first capacitor between the positive bus and the a-c bus;
means for connecting the second capacitor between the negative bus and the a-c bus;
a clamping diode for limiting the reverse voltage across the second switching means to the voltage across the first capacitor; and
means for connecting the clamping diode to the positive bus and the junction of the second switching means and the second winding.

* * * * *